United States Patent
Kocabas et al.

(10) Patent No.: US 12,321,074 B2
(45) Date of Patent: Jun. 3, 2025

(54) MULTISPECTRAL ELECTRO-OPTICAL ION-INTERCALATED GRAPHENE ELECTROCHROME CELLS

(71) Applicant: The University of Manchester, Manchester (GB)

(72) Inventors: Coskun Kocabas, Manchester (GB); Gokhan Bakan, Manchester (GB); Muhammed Said Ergoktas, Manchester (GB)

(73) Assignee: The University of Manchester, Manchester (GB)

( * ) Notice: Subject to any disclaimer, the term of this patent is extended or adjusted under 35 U.S.C. 154(b) by 379 days.

(21) Appl. No.: 17/999,790

(22) PCT Filed: May 26, 2021

(86) PCT No.: PCT/GB2021/051272
§ 371 (c)(1),
(2) Date: Nov. 23, 2022

(87) PCT Pub. No.: WO2021/240147
PCT Pub. Date: Dec. 2, 2021

(65) Prior Publication Data
US 2023/0236465 A1  Jul. 27, 2023

(30) Foreign Application Priority Data
May 26, 2020 (GB) ....................... 2007808

(51) Int. Cl.
*G02F 1/1524* (2019.01)
*G02B 5/00* (2006.01)
*G02F 1/1523* (2019.01)

(52) U.S. Cl.
CPC ........... *G02F 1/1524* (2019.01); *G02B 5/008* (2013.01); *G02F 1/1525* (2013.01)

(58) Field of Classification Search
CPC ................. G02F 1/1524; G02F 1/1525; G02F 2001/1557; G02F 2001/1552; G02B 5/008
See application file for complete search history.

(56) References Cited

U.S. PATENT DOCUMENTS 5,413,739 A * 5/1995 Coleman ............... H01B 1/24
                                                  252/511
2010/0202035 A1* 8/2010 Noh ..................... G02F 1/155
                                                  977/932
(Continued)

FOREIGN PATENT DOCUMENTS

CN   108227333 A   6/2018
CN   108363221 A   8/2018
(Continued)

OTHER PUBLICATIONS

Salihoglu, O., et al., "Graphene Based Adaptive Thermal Camouflage", Nano Lett., Jun. 27, 2018, 18(7) 4541-4548.
(Continued)

*Primary Examiner* — George G. King
(74) *Attorney, Agent, or Firm* — Hamilton, Brook, Smith & Reynolds, P.C.

(57) ABSTRACT

This invention relates to devices that can controllably vary the properties of graphene with respect to different wavelengths of electromagnetic radiation and particularly its optical properties. The electronically variable optical surfaces of the invention comprise graphene layers with intercalated metal (e.g. lithium) ions. The cell comprises an Li-NMC anode as ion source, an ionic liquid electrolyte, and an multilayer graphene cathode.

24 Claims, 12 Drawing Sheets

(56) References Cited

U.S. PATENT DOCUMENTS

| | | | | |
|---|---|---|---|---|
| 2013/0010346 A1* | 1/2013 | Risser | ............ | G02F 1/1516 359/266 |
| 2015/0219974 A1* | 8/2015 | Trajkovska-Broach | ............ | G02F 1/1525 359/275 |
| 2018/0364540 A1 | 12/2018 | Winoto et al. | | |

FOREIGN PATENT DOCUMENTS

| | | | |
|---|---|---|---|
| CN | 109950496 | A | 6/2019 |
| CN | 110336677 | A | 10/2019 |
| EP | 0672978 | A2 | 9/1995 |
| IN | 108628052 | A | 10/2018 |
| KR | 102052077 | B1 | 12/2019 |
| WO | 2017213614 | A1 | 12/2017 |
| WO | 2019024596 | A1 | 2/2019 |

OTHER PUBLICATIONS

Zhao, L., et al., Tunable Infrared Emissivity in Multilayer Graphene by Ionic Liquid Intercalation, Nanomaterials, vol. 9, No. 8, Jul. 31, 2019.

Kamboj., V., "Low-bias gate tunable terahertz plasmonic signatures in chemical vapour deposited graphene of varying grain size", Proceedings of SPIE; [Proceedings of SPIE ISSN 0277-786X vol. 10524], SPIE, US, vol. 9747, Feb. 25, 2016.

Zhang, B., et al., "Modeling and simulation of light reflection and transmission characteristics of electrically modulated infrared nano-apexes", SPI E Proceedings; [Proceedings of SPIE ISSN 0277-786X], SPIE, US, vol. 11428, Feb. 14, 2020.

Matthaiakaki, S., "Excitation and dynamic control of plasmons in Graphene by utilizing a 2-dimensional inverted pyramid array diffraction grating", 2017 Conference on Lasers and Electro-Optics Europe & European Quantum Electronics Conference (CLEO/Europe-EQEC), IEEE, Jun. 25, 2017.

Notification of Transmittal of the International Search Report and the Written Opinion of the International Searching Authority, or the Declaration for International Application No. PCT/GB2021/051272 "Multispectral Electro-Optical Ion-Intercalated Graphense Electrochrome Cells", date of mailing: Aug. 23, 2021.

Wuttig, M., et al., "Phase-change materials for non-volatile photonic applications", Nature Photonics, 2017, 11, 465-476.

Hosseini, P., et al., "An optoelectronic framework enabled by low-dimensional phase-change films", Nature, 2014, 511, 206-211.

Lin, J., et al., "Thermochromic halide perovskite solar cells", Nat. Mater., 2018, 261-267.

Yu, C., et al., "Adaptive optoelectronic camouflage systems with designs inspired by cephalopod skins", Proc. Natl. Acad. Sci. USA, Aug. 18, 2014, 111(36): 12998-13003.

* cited by examiner

MULTISPECTRAL ELECTRO-OPTICAL ION-INTERCALATED GRAPHENE ELECTROCHROME CELLS

This application is the U.S. National Stage of International Application No. PCT/GB2021/051272, filed on May 26, 2021, which designates the U.S., published in English, and claims priority under 35 U.S.C. § 119 or 365 (c) to Great Britain Application No. 2007808.5, filed on May 26, 2020. The entire teachings of the above applications are incorporated herein by reference.

This invention relates to devices that can controllably vary the properties of graphene with respect to different wavelengths of electromagnetic radiation and particularly its optical properties. The electronically variable optical surfaces of the invention comprise graphene layers with intercalated metal (e.g. lithium) ions.

BACKGROUND

The ability to control the visible properties of a surface finds application in many different contexts. If you can control the wavelength of the visible light which is reflected or emitted from a surface, you can change the colour of the surface. Smart optical surfaces find potential use in the field of wearable technologies, as well as in multispectral display devices as adaptive reflectors and as indicators of the state of charge of a battery.

External stimuli (e.g., temperature, electric field, light, and reagent) can induce phase transitions from amorphous to crystalline or metallic to insulating states, leading to drastic changes in the optical properties of a material.

These phase transitions have been utilised for non-volatile photonic applications (*Nature Photonics*, 2017, 11, 465-476). Additionally, Hosseini et al. (*Nature*, 2014, 511, 206-211) describes optoelectronic frameworks comprising phase-change materials for use in display devices, and Lin et al. (*Nat. Mater.*, 2018, 261-267) describes thermochromic halide perovskite solar cells which undergo thermally-driven, moisture-mediated reversible phase transition, useful in smart photovoltaic window applications. Unfortunately, low mobility of free carriers on these crystals limits the free carrier response in infrared wavelengths, while the free carrier response in the visible wavelengths is governed by interband electronic transitions. As a result, known colour-changing materials display poor efficiency in real-life applications.

Yu et al. (*Proc. Natl. Acad. Sci. USA.*, 2014, 111, 36) describes adaptive optoelectronic camouflage systems which replicate the visual appearance modulation of cephalopod skins without any user input.

More recently, Kocabas et al. (*Nano Lett.* 2018, 18, 4541-4548) have described the use of graphene layers as controllable emitters of thermal radiation. These devices comprise a porous polyethylene membrane, an ionic liquid and a plurality of atomic layers of graphene. Again, the efficiency of these materials has a strong wavelength dependence, thereby limiting their functionality to a narrow spectral range.

It is an aim of certain embodiments of this invention to provide a graphene-based electro-optical device that is more efficient than prior art devices.

Another aim of certain embodiments of this invention is to provide a graphene-based electro-optical device with a broad optical tunability covering all wavelength regimes in the electromagnetic spectrum from ultraviolet to microwave.

BRIEF SUMMARY OF THE DISCLOSURE

In a first aspect of the present invention, there is provided a device for controlling the optical properties and/or emissivity of an active layer, the device comprising:
  an active layer comprising from 5 to 500 atomic layers of graphene, the active layer having a first surface and a second surface, wherein the device is configured such that the first surface of the active layer is visible while the device is in use;
  a porous membrane comprising a liquid electrolyte, said membrane having a first surface and a second surface, wherein the second surface of the active layer is in contact with the first surface of the porous membrane, and wherein the liquid electrolyte comprises metal (e.g. lithium) ions;
  a metal (e.g. lithium) ion source in contact with the second surface of the porous membrane;
  a cathode layer having a first surface and a second surface, wherein the first surface of the cathode layer is in contact with the metal (e.g. lithium) ion source; and
  a means for applying a controllably variable electric potential between the cathode layer and the active layer.

In a second aspect of the present invention, there is provided a method of varying the optical properties and/or emissivity of the first surface of the active layer of the device of the first aspect, the method comprising varying the electric potential that is applied between the cathode layer and the active layer.

When an electric potential is applied between the cathode layer and the active layer, metal (e.g. lithium) ions from the liquid electrolyte intercalate between the graphene layers of the active layer, resulting in a change in the electrical, optical and emissive properties of the active layer. When fully charged (~3.7 V), the intercalation of the metal (e.g. lithium) ions from the liquid electrolyte into the graphene layers causes the first surface of the active layer to present a substantially reflective colour (e.g. gold). The intercalated graphene also exhibits high infrared reflectivity and suppressed infrared emissivity. At 0 V, most of the metal (e.g. lithium) ions of liquid electrolyte are present in the porous membrane and few remain intercalated in the active layer. As a result, the first surface of the active layer presents a substantially absorptive colour (e.g. dark grey/black) and also exhibits high emissivity, e.g. of infrared radiation or terahertz radiation. The changes in optical properties and emissivity of other wavelengths, e.g. infrared radiation, terahertz radiation and ultraviolet radiation, occur at different voltages, meaning that the properties of the active layer with respect to different portions of the electromagnetic can be controlled by varying the applied potential. Additionally, it may be that a portion of the metal (e.g. lithium) ions from the liquid electrolyte are deposited onto the second surface of the active layer as solid metal (e.g. solid lithium metal) when an electric potential is applied between the cathode layer and the active layer.

For the avoidance of doubt, when an electric potential is applied between the cathode layer and the active layer, it may be that all of the metal (e.g. lithium) ions intercalate into the graphene layers, or it may be that a portion of the metal (e.g. lithium) ions intercalate into the graphene layers and another portion of the metal (e.g. lithium) ions are deposited as solid metal (e.g. solid lithium metal) onto the second surface of the active layer.

In a third aspect of the present invention, there is provided a method of making a device of the first aspect of the invention, the method comprising the steps of: (i) contacting the second surface of the porous membrane with the metal (e.g. lithium) ion source (ii) diffusing liquid electrolyte comprising metal (e.g. lithium) ions into the porous membrane; and (iii) contacting the second surface of the active layer with the first surface of the porous membrane.

The device of the first aspect may be suitable for carrying out the method of the second aspect. The method of the second aspect of the invention may be carried out on the device of the first aspect.

The device of the first aspect may be obtainable by (e.g. obtained by) the method of the third aspect. The method of the second aspect of the invention may be carried out on the device obtainable by (e.g. obtained by) the method of the third aspect.

The invention also provides a battery level indicator comprising the device of the first aspect.

The invention also provides a multispectral display device comprising the device of the first aspect.

Device

The metal ions may be selected from the group comprising: lithium, aluminium, sodium, potassium, platinum, gold, silver, copper or nickel. The metal ions may be lithium ions or aluminium ions. Preferably, the metal ions are lithium ions.

The device may further comprise a protective layer, in contact with the first surface of the active layer. If present, the protective layer is typically transparent to visible light. The protective layer may allow greater than 50% transmittance of visible light. The protective layer may allow greater than 70% (e.g. greater than 80%) transmittance of visible light. The protective layer may also be transparent to infrared radiation and/or terahertz radiation. The protective layer may also be transparent to ultraviolet radiation. The protective layer may allow greater than 50% transmittance of visible light. The protective layer may allow greater than 70% (e.g. greater than 80%) transmittance of infrared radiation and/or terahertz radiation. The protective layer may allow greater than 70% (e.g. greater than 80%) transmittance of ultraviolet radiation. The protective layer may comprise one or more of: polyethylene, polypropylene, fluorinated ethylene propylene, diamond-like carbon, polytetrafluoroethylene, parylene, chlorinated parylene, fluorinated parylene, parylene derivatives, silicon and germanium thin films. The protective layer may comprise one or more of: polyethylene, polypropylene, fluorinated ethylene propylene, diamond-like carbon, polytetrafluoroethylene, parylene, chlorinated parylene, fluorinated parylene, silicon and germanium thin films. The protective layer may comprise one or more of: polyethylene, polypropylene, fluorinated ethylene propylene, diamond-like carbon, polytetrafluoroethylene, silicon and germanium thin films. The protective layer may be polyethylene. The protective layer may be low density polyethylene. The protective layer may be diamond-like carbon. The protective layer may have a thickness in the range 1 μm to 100 μm. The protective layer may have a thickness in the range 5 μm to 50 μm. The protective layer may have a thickness in the range 8 μm to 30 μm. The protective layer may have a thickness in the range 10 μm to 25 μm.

There may be adhesive means between the protective layer and the active layer. This adhesive means will typically either be transparent to visible light or it will be patterned such that it covers 50% or less (e.g. 10% or less) of the first surface of the active layer. Where the adhesive means is transparent to visible light, it may also be transparent to infrared radiation and/or terahertz radiation. Where the adhesive means is transparent to visible light, it may also be transparent to ultraviolet radiation. Alternatively, the protective layer may have been treated in such a way as to increase the adhesion between the protective layer and the active layer. The protective layer may have been treated with a plasma, e.g. an oxygen plasma, to increase the adhesion between the protective layer and the active layer.

The active layer comprises 5 to 500 atomic layers of graphene. The active layer may comprise 15 to 500 atomic layers of graphene. The active layer may comprise 25 to 500 atomic layers of graphene. The active layer may comprise at least 50 atomic layers of graphene. The active layer may comprise 50 to 500 atomic layers of graphene. The active layer may comprise at least 100 atomic layers of graphene. The active layer may comprise no more than 400 atomic layers of graphene. The active layer may comprise no more than 300 atomic layers of graphene. The active layer may comprise no more than 200 atomic layers of graphene. The active layer may comprise no more than 150 atomic layers of graphene. The active layer may comprise 100 to 200 atomic layers of graphene. Preferably, the active layer may comprise 50 to 150 atomic layers of graphene. Without wishing to be bound by theory, it is believed that when the active layer comprises more than 500 atomic layers of graphene, diffusion of metal (e.g. lithium) ions into the distal layers of the multilayer graphene is insufficient and thus no discernible change in the optical properties of the active layer is achieved. Likewise, if too few layers are used the net effect in visible light reflectivity may not be sufficient to provide a visible difference detectable to the human eye. Fewer layers of graphene may still be suitable for applications in which the control of emissivity is desired and the control of the visible properties is less important.

It may be that the device is configured such that just a portion of the first surface of the active layer is visible when the device is use. For example, less than 80% of the first surface of the active layer may be visible. It may be that the devices is configured such that substantially all (e.g. greater than 90%) of the first surface of the active layer is visible when the device is in use. The first surface of the active layer may be visible through the protective layer (if present). The device may be configured, e.g. arranged in its housing, in such a way that the visibility of the first surface of the active layer may be unobstructed to the user.

It may be that the layered structure described above is situated in a housing and the first surface of the active layer is visible through an aperture in the housing. Thus the aperture may be a gap in the housing or the aperture may formed of a material that is transparent to visible light, infrared radiation and/or terahertz radiation.

When used as a battery level indicator, the first surface of the active layer may be visible at the surface of the battery. Typically, the visual appearance of the first surface active layer provides the user with an indication of the level of charge in the battery. If the visible portion of the first surface of the active layer presents a substantially reflective colour, the battery may be fully charged. If the visible portion of the first surface of the active layer presents a substantially absorptive colour, the batter may be fully discharged.

Typically, when the devices of the invention are produced, the atomic layers of graphene are bonded together as the atomic layers are in graphite. Where this is the case, typically the first time an electric potential is applied between the cathode layer and the active layer, the ions of the liquid electrolyte intercalate in between the graphene atomic layers, separating them and causing the interlayer bonding in the graphitic structure to cease. More of one set of ions in the liquid electrolyte (e.g. cations, preferably lithium cations) intercalate than the other set of ions (e.g. anions) in this initial intercalation step and in any subsequent application of electric potential. Typically, only the metal (e.g. lithium) cations intercalate in between the graphene atomic layers. The metal (e.g. lithium) ion source provides additional metal (e.g. lithium) ions to the liquid electrolyte for intercalation in between the graphene atomic layers. The inventors used Raman spectroscopy to demonstrate the intercalation of metal (e.g. lithium) ions into the graphene atomic layers. It is believed that the graphitic bonding does not reform once the electric potential is removed and at least some of the intercalated metal (e.g. lithium) ions remain in between the graphene. When the potential is reversed, the metal (e.g. lithium) cations are believed to de-intercalate from between the graphene atomic layers and return to the liquid electrolyte and/or the metal (e.g. lithium) ion source.

The graphene atomic layers may have a graphitic structure.

Alternatively, the atomic layers of graphene may be present in the form of a stack of independent single layer graphene flakes. The atomic layers of graphene may be present in the form of independent few-layer graphene flakes, e.g. graphene flakes that are 2 to 5 atomic layers thick. The atomic layers of graphene may be present in the form of a mixture of independent single layer and few-layer graphene flakes. Independent, in this context means that the bonding between the graphene flakes is non-graphitic. In these embodiments, metal (e.g. lithium) ions are typically intercalated between the graphene flakes.

The graphene is typically pristine graphene, e.g. graphene that is greater than 90 atomic % carbon, graphene that is greater than 95 atomic % carbon, or graphene that is greater than 99 atomic % carbon. The graphene may have a sheet resistance of 20 kΩ/sq or less, 10 kΩ/sq or less, 5 kΩ/sq or less, 1 kΩ/sq or less, 0.5 kΩ/sq or less, or 0.1 kΩ/sq or less. The graphene may be formed by chemical vapour deposition (CVD). CVD graphene is believed to be more effective than graphene obtained by other means.

The graphene in the active layer may act as an anode. Alternatively, the device may further comprise an additional anode in electrical communication with the active layer. The additional anode may be a copper anode.

Where an additional anode is present, it may be that the anode is situated such that it does not prevent the passage of metal (e.g. lithium) ions from the porous membrane to the active layer. Likewise, it may be that the anode is situated such that it does not obstruct the view to the active layer. The anode may be in contact with no more than 50% (e.g. with no more than 20%) of the surface area of the first surface of the porous membrane. The anode may be in contact with no more than 50% (e.g. with no more than 20%) of the surface area of the first or second surface of the active layer.

The active layer may be in contact with at least 50% of the surface area of the first surface of the porous membrane, e.g. at least 75% or at least 95% of the first surface of the porous membrane.

The active layer may be flat. Alternatively, the active layer may be corrugated.

The device may be a planar device. The protective layer (if present), the active layer, the additional anode layer (if present), the porous membrane, the metal (e.g. lithium) ion source and the cathode layer together form a stack.

The device may be a tunable plasmonic device. In such an embodiment, the active layer is corrugated.

The porous membrane may be a non-woven material. The porous membrane may be formed of a natural material, e.g. cotton, cellulose. The porous membrane may be formed of a synthetic material. The porous membrane may be a polymeric membrane. The porous membrane may comprise one or more of polyethylene, polypropylene, poly(tetrafluoroethylene), polyvinyl chloride, cellulose paper, polyvinylidene fluoride (pvdf), polyolefins, polyester, nylon, nanofiber separators. The porous membrane may be a ceramic membrane.

The porous membrane may have a thickness in the range 1 μm to 1 mm. The porous membrane may have a thickness in the range 1 μm to 500 μm. The porous membrane may have a thickness in the range 1 μm to 250 μm. The porous membrane may have a thickness in the range 1 μm to 100 μm. The porous membrane may have a thickness in the range 5 μm to 50 μm. The porous membrane may have a thickness in the range 10 μm to 30 μm.

The porous membrane may have a pore size in the range of from 10 nm to 1 μm. The porous membrane may have a pore size in the range of from 10 nm to 500 nm. The porous membrane may have a pore size in the range of from 10 nm to 250 nm. The porous membrane may have a pore size in the range of from 10 nm to 100 nm. The porous membrane may have a pore size in the range of from 30 nm to 100 nm. The pore size may be selected such that metal (e.g. lithium) ions can pass through the porous membrane.

The porous membrane may have a porosity percentage of about 25% to about 50%. The porous membrane may have a porosity percentage of about 30% to about 50%. The porous membrane may have a porosity percentage of about 30% to about 40%. The porous membrane may have a porosity percentage of about 40% to about 50%.

The liquid electrolyte will typically be absorbed into the porous membrane. The porous membrane may be saturated with the liquid electrolyte. The liquid electrolyte may be absorbed into the fibres of the porous membrane and/or may be situated in the pores of the porous membrane.

The liquid electrolyte may comprise a metal (e.g. lithium) salt dissolved in a solvent, e.g. an organic solvent. The liquid electrolyte may comprise a lithium or aluminium salt dissolved in a solvent, e.g. an organic solvent. The liquid electrolyte may comprise a eutectic mixture comprising a lithium or aluminium salt. The liquid electrolyte will typically comprise a lithium salt dissolved in a solvent, e.g. an organic solvent.

The liquid electrolyte may comprise a metal (e.g. lithium) cation and an organic anion. The liquid electrolyte may comprise a lithium or aluminium cation and an organic anion. The liquid electrolyte may comprise a lithium cation and an organic anion. Examples of anions include: alkylsulfate (e.g. ethyl sulfate, methanesulfonate, trifluoromethylsulfonate), dialkylphosphate (e.g. dimethyl phosphate, diethylphosphatre), tosylate, dichloroacetic acid. acetate bis(trifluoromethylsulfonyl)imide, hexafluorophosphate, tetrafluoroborate, tetrachloroaluminate, and halide (e.g. chloride, bromide, iodide), dicyanamide, dihydrogen phosphate, hydrogensulfate, nitrate and thiocyanate. The liquid electrolyte may comprise a species selected from: lithium hexafluorophosphate, lithium hexafluoroarsenate monohydrate, lithium perchlorate, lithium tetrafluoro borate, lithium triflate, lithium bis(oxalato)borate, lithium hexafluoroarsenate, lithium difluoro(oxalato)borate, and aluminium 1-ethyl-3-methylimidazolium chloride ($AlCl_3$:EMIMCl). The liquid electrolyte may comprise a species selected from: lithium hexafluorophosphate, lithium hexafluoroarsenate monohydrate, lithium perchlorate, lithium tetrafluoro borate, lithium triflate, lithium bis(oxalato)borate, lithium hexafluoroarsenate, and lithium difluoro(oxalato)borate. The liquid electrolyte is preferably selected from: lithium hexafluorophosphate, lithium hexafluoroarsenate monohydrate, lithium perchlorate, lithium tetrafluoro borate, lithium triflate, lithium bis(oxalato)borate, lithium hexafluoroarsenate, and lithium difluoro(oxalato)borate. The liquid electrolyte may comprise aluminium 1-ethyl-3-methylimidazolium chloride ($AlCl_3$:EMIMCl). Preferably, the liquid electrolyte comprises lithium hexafluorophosphate.

The liquid electrolyte may further comprise one or more organic solvents. The one or more organic solvents may comprise cyclic and/or acyclic carbonate-based solvents, e.g. ethylene carbonate, propylene carbonate, dimethyl carbonate, diethyl carbonate, ethyl methyl carbonate, fluoroethylene carbonate. The one or more organic solvents may comprise ethylene carbonate and diethyl carbonate.

The liquid electrolyte may further comprise one or more additives, e.g. vinylene carbonate (VC), $LiPO_2F_2$ (LPF), VC+LPF, 1,3-propane sultone, adiponitrile, 2-propynyl methanesulfonate, cyclohexylbenzene, tert-amyl benzene. The additives may prevent the one or more organic solvents of the liquid electrolyte from penetrating the active layer. Typically, the first time an electric potential is applied between the cathode layer and the active layer, the additives form a coating on the second surface of the active layer. This additive coating remains on the second surface of the active layer when the electric potential is removed and in any subsequent application of electric potential.

The additive coating may give rise to selective transmission of metal (e.g. lithium) ions into the active layer. It may be that the additive coating allows more than one set of ions (e.g. cations) in the liquid electrolyte to intercalate than the other set of ions (e.g. anions). For example, the additive coating may allow the metal (e.g. lithium) ions of the liquid electrolyte to intercalate into the active layer while preventing transport of the liquid electrolyte itself into the active layer.

The metal (e.g. lithium) ion source may be in contact with substantially all portions of the second surface of the porous membrane that correspond to the portions of the first surface of the porous membrane that are in contact with the second surface of the active layer. Additionally, the metal (e.g. lithium) ion source may be in contact with substantially all portions of the first surface of the cathode layer. The metal (e.g. lithium) ion source may be patterned such that it comprises a plurality of single patches (pixels') that are electrically isolated from one another.

When an electric potential is applied between the cathode layer and the active layer, metal (e.g. lithium) ions in the metal (e.g. lithium) ion source may dissociate into the liquid electrolyte and intercalate between the graphene layers of the active layer.

The metal (e.g. lithium) ion source typically is in the form of a layer having a first surface and a second surface, the first surface being in contact with the second surface of the porous membrane and a second surface being in contact with the first surface of the cathode layer.

The metal (e.g. lithium) ion source may comprise a material selected from: lithium nickel manganese cobalt oxide (NMC), lithium cobalt oxide (LCO), lithium manganese oxide (LMO), lithium iron phosphate (LPF), lithium nickel manganese spinel (LNMO), lithium nickel cobalt aluminium oxide (NCA), and lithium metal (e.g. lithium foil, lithium chips, lithium-coated foils, lithium metal coating). The metal (e.g. lithium) ion source may comprise lithium nickel manganese cobalt oxide (NMC).

The cathode layer may comprise a material selected from: aluminium, stainless steel, copper, nickel, graphite-coated copper, graphite, or graphene film. The cathode layer may comprise aluminium. The cathode layer may be a foil.

The cathode layer may be substantially opaque to visible light. The cathode layer may prevent the transmission of visible light.

The first surface of the cathode layer may be coated in the metal (e.g. lithium) ion source. Alternatively, both the first surface and the second surface of the cathode layer may be coated in the metal (e.g. lithium) ion source.

The cathode layer and the metal ion source may be the same species. For example, where the metal ion is aluminium, the cathode layer may comprise aluminium and also act as the aluminium ion source.

The cathode layer may be patterned such that it comprises a plurality of single patches ('pixels') that are electrically isolated from one another. The cathode layer and/or the metal (e.g. lithium) ion source may be patterned such that the pixels of the ion source correspond to the pixels of the cathode layer. Typically, the cathode layer and the metal (e.g. lithium) ion source are patterned such that the pixels of the ion source correspond to the pixels of the cathode layer. When in use, it may be that the means for providing an electrical potential is such that the electric potential applied between each pixel and the active layer may be adjusted independently. This allows the optical properties and/or emissive properties of the portions of the active layer that correspond to the pixels of the ion source and cathode to be adjusted independently.

The device may comprise a power source which provides an electric potential to the means for applying an electric potential between the cathode layer and the active layer.

The invention also provides a battery and charge level indicator comprising a device of the invention. In these embodiments, at least a portion of the surface of the battery comprises the active layer. In such an embodiment, the active layer may present a substantially reflective colour (e.g. gold) when the battery is fully charged, and may present a substantially absorptive colour (e.g. black/grey) when the battery is discharged. Thus, the battery level indicator provides visual feedback of the level of charge in the battery. This visual feedback of the state of charge occurs without reducing the level of charge in the battery.

The invention also provides a reflector for a satellite comprising a device of the invention. In these embodiments, the material of which the external panels of a satellite are made is typically the active layer. High temperatures or temperature differences may be harmful to the satellite and its electronics. In such an embodiment, the optical properties of the active layer are varied to regulate the absorption of visible light and emission of infra-red radiation by the active layer. For example, the device may be configured to present a reflective colour when exposed to direct sunlight, and/or may be configured to present an absorptive colour when facing deep-space.

Methods of Varying the Properties of a Surface

It may be that the electric potential that is applied between the cathode layer and the active layer is varied between 0 and 5 V.

The electric current flowing through the device may be varied between −1 and 1 $A/cm^2$. To achieve intercalation of metal (e.g. lithium) ions between the graphene layers of the active layer, the electric current flowing through the device may be varied between 0 and 1 $A/cm^2$. To achieve de-intercalation of metal (e.g. lithium) ions from between the graphene layers of the active layer, the electric current flowing through the device may be varied between 0 and −1 A/cm².

Where the cathode layer and ion source are pixelated, the step of varying the electric potential that is applied between the cathode layer and the active layer typically comprises independently varying the electric potential that is applied between each pixel of the cathode layer and the active layer. Thus the emissive/reflective properties of the each pixel of the active layer can be controlled independently.

Alternatively, the electric potential may be applied between substantially all of the cathode layer and the active layer.

Typically, the optical properties that may be controllably varied in the method of the invention is the emissivity/reflectivity of the first surface of the active layer to radiation in the visible light range. It may be that the emissivity that is being controlled in the method of the invention is the emissivity of the first surface of the active layer to infrared radiation. It may be that the emissivity that is being controlled in the method of the invention is the emissivity of the first surface of the active layer to terahertz radiation. It may be that the emissivity that is being controlled in the method of the invention is the emissivity of the first surface of the active layer to ultraviolet radiation.

Without wishing to be bound by theory, it is thought that the nature of the properties of the first surface of the active layer is dependent on the degree of lithiation of the multilayer graphene. The degree of lithiation is dependent on the voltage that is applied. The potential that is applied may be such that the atomic ratio of metal (e.g. lithium):carbon in the multilayer graphene is greater than 1:10, e.g. from 1:5 to 1:7. This typically leads to low visible light emissivity and a reflective (e.g. gold) appearance, as well as low emissivity of infrared radiation and terahertz radiation. The potential that is applied may be such that the atomic ratio of metal (e.g. lithium):carbon in the multilayer graphene is from 1:10 and 1:18, e.g. from 1:12 to 1:14. This typically leads to low visible light reflectivity and an absorptive (e.g. black/grey) appearance but low emissivity of infrared radiation and terahertz radiation. The potential that is applied may be such that the atomic ratio of metal (e.g. lithium):carbon in the multilayer graphene is from 1:18 to 1:30, e.g. from 1:22 to 1:26. This typically leads to low visible light reflectivity and an absorptive (e.g. black/grey) appearance and high emissivity of infrared radiation but low emissivity of terahertz radiation.

The degree of lithiation of the multilayer graphene may be controlled by adjusting the electric potential applied to the device. A positive non-linear relationship may exist between the electric potential and the degree of lithiation. It may be a discrete intercalation stage corresponding to a particular wavelength regime is achieved across a range of applied electric potentials (see, for example, FIG. 2d).

It may be that the electric potential that is applied between the cathode layer and the active layer is from about 3.6 V to about 3.8 V. In certain specific devices of the invention, this leads to high visible light reflectivity and a reflective (e.g. gold) appearance, as well as low emissivity of infrared radiation and terahertz radiation.

It may be that the electric potential that is applied between the cathode layer and the active layer is from about 3.5 V to about 3.6 V. In certain specific devices of the invention, this leads to low visible light reflectivity and an absorptive (e.g. black/grey) appearance but low emissivity of infrared radiation and terahertz radiation.

It may be that the electric potential that is applied between the cathode layer and the active layer is from about 3.3 V to about 3.5 V. In certain specific devices of the invention, this leads to low visible light reflectivity and an absorptive (e.g. black/grey) appearance and high emissivity of infrared radiation but low emissivity of terahertz radiation.

Methods of Making a Device

The method of making the device of the first aspect may further comprise forming a plurality of graphene layers on a foil to generate the active layer. The layers may be formed by CVD. The foil is preferably Ni foil. The method may comprise separating the plurality of graphene layers from the foil, e.g. by etching.

Where a protective layer is in contact with the first surface of the active layer, the method may comprise to step of contacting the protective layer with the first surface of the active layer. The introduction of the protective layer onto the first surface of the active layer may occur prior to removal of the foil, where the plurality of graphene layers are grown on a foil.

The step of contacting the protective layer with the first surface of the active layer may further comprise applying an adhesive onto the first surface of the active layer and/or the protective layer and then contacting the protective layer and the first surface of the active layer. The adhesive may cover 50% or less (e.g. 10% or less) of the second surface of the active layer. The adhesive may be a hot melt adhesive.

Alternatively, the step of contacting the protective layer with the first surface of the active layer may further comprise treatment of the protective layer and then contacting the protective layer and the first surface of the active layer. The treatment of the protective layer may be treatment with a plasma, e.g. an oxygen plasma.

The step of contacting the second surface of the active layer with the first surface of the porous membrane may further comprise applying an adhesive onto the first surface of the porous membrane and then contacting the second surface of the active layer to the first surface of the porous membrane. The adhesive may be sufficiently porous to allow metal (e.g. lithium) ion transport between the porous membrane and the active layer. The adhesive may cover 100% or less of the second surface of the active layer. The adhesive may cover 50% or less (e.g. 10% or less) of the second surface of the active layer. The adhesive may be a hot melt adhesive.

Alternatively, the step of contacting the second surface of the active layer with the first surface of the porous membrane may further comprise treatment of the first surface of the porous membrane and then contacting the second surface of the active layer with the first surface of the porous membrane. The treatment of the porous membrane may be treatment with a plasma, e.g. an oxygen plasma.

Alternatively, the step of contacting the second surface of the active layer with the first surface of the porous membrane may comprise placing the second surface of the active layer onto the first surface of the porous membrane.

Typically step i) occurs before step ii) and step ii) occurs before step iii).

The step of contacting the second surface of the porous membrane with the metal (e.g. lithium) ion source typically comprises placing the second surface of the porous membrane on the metal (e.g. lithium) ion source.

Typically the metal (e.g. lithium) ion source and the cathode layer are supplied as a composite product. The step of contacting the second surface of the porous membrane with the metal (e.g. lithium) ion source typically comprises placing the second surface of the porous membrane on the composite metal (e.g. lithium) ion source/cathode layer.

It may be that the process comprises; forming a stack of the cathode layer, the metal (e.g. lithium) ion source, the porous membrane comprising the electrolyte, the active layer and optionally an anode; and subjecting the stack to force in order to push the layers of the stack together.

It may be that the process comprises; forming a stack of the cathode layer, the metal (e.g. lithium) ion source, the porous membrane comprising the electrolyte, the active layer and optionally an anode; placing the stack in a pouch; and vacuum sealing the pouch.

Said pouch typically has three edges sealed and one edge open. The portion of the pouch that is in contact with the first surface of the active layer is typically the protective layer. Vacuum sealing the pouch compresses the stack, pushing the layers of the stack together.

Typically, the methods of the invention provide a device of the first aspect in which the graphene atomic layers may have a graphitic structure. The method may comprise applying an electric potential between the cathode layer and the active layer to form a device of the first aspect in which the graphene atomic layers are in the form of graphene flakes (i.e. single layer graphene flakes, few-layer graphene flakes or a mixture thereof). Typically, metal (e.g. lithium) ions from the electrolyte will be intercalated between said graphene flakes during a method of the invention.

The present application and invention further includes the subject-matter of the following numbered paragraphs:

1. A device for controlling the optical properties and/or emissivity of an active layer, the device comprising:
   an active layer comprising from 5 to 500 atomic layers of graphene, the active layer having a first surface and a second surface, wherein the device is configured such that the first surface of the active layer is visible while the device is in use;
   a porous membrane comprising a liquid electrolyte, said membrane having a first surface and a second surface; wherein the second surface of the active layer are in contact with the first surface of the porous membrane, and wherein the liquid electrolyte comprises lithium ions;
   a lithium ion source in contact with the second surface of the porous membrane;
   a cathode layer having a first surface and a second surface, wherein the first surface of the cathode layer is in contact with the lithium ion source; and
   a means for applying a controllably variable electric potential between the cathode layer and the active layer.

2. The device of paragraph 1, wherein the device further comprises a protective layer in contact with the first surface of the active layer.

3. The device of paragraph 2, wherein the protective layer may comprise one or more of: polyethylene, polypropylene, fluorinated ethylene propylene, diamond-like carbon, polytetrafluoroethylene, silicon and germanium thin films.

4. The device of paragraph 3, wherein the protective layer is polyethylene, optionally wherein the protective layer is low density polyethylene.

5. The device of any of paragraphs 2 to 4, wherein the protective layer has a thickness in the range 1 µm to 100 µm.

6. The device of any of paragraphs 1 to 5, wherein the active layer comprises from 50 to 500 atomic layers of graphene.

7. The device of any of paragraphs 1 to 6, wherein the active layer comprises from 100 to 200 atomic layers of graphene.

8. The device of any of paragraphs 1 to 7, wherein the active layer is flat.

9. The device of any of paragraphs 1 to 8, wherein the device is a tunable plasmonic device.

10. The device of paragraph 9, wherein the active layer is corrugated.

11. The device of any of paragraphs 1 to 10, wherein the porous membrane is a polymeric membrane.

12. The device of paragraph 11, wherein the porous membrane comprises one or more of: polyethylene, polypropylene, poly(tetrafluoroethylene), polyvinyl chloride, cotton, cellulose, cellulose paper, polyvinylidene fluoride (pvdf), polyolefins, polyester, nylon, nanofiber separators.

13. The device of any of paragraphs 1 to 12, wherein the liquid electrolyte is absorbed into the porous membrane.

14. The device of any of paragraphs 1 to 13, wherein the liquid electrolyte is selected from: lithium hexafluorophosphate, lithium hexafluoroarsenate monohydrate, lithium perchlorate, lithium tetrafluoro borate, lithium triflate, lithium bis(oxalato)borate, lithium hexafluoroarsenate, and lithium difluoro(oxalato)borate.

15. The device of any of paragraphs 1 to 14, wherein the lithium ion source is in contact with substantially all portions of the second surface of the porous membrane that correspond to the portions of the first surface of the porous membrane that are in contact with the active layer 16. The device of any of paragraphs 1 to 15, wherein the lithium ion source comprises a material selected from: lithium nickel manganese cobalt oxide (NMC), lithium cobalt oxide (LCO), lithium manganese oxide (LMO), lithium iron phosphate (LPF), lithium nickel manganese spinel (LNMO), lithium nickel cobalt aluminium oxide (NCA), lithium foil, lithium chips, lithium-coated foils, and lithium metal coating 17. The device of paragraph 16, wherein the lithium ion source is lithium nickel manganese cobalt oxide (NMC).

18. The device of any of paragraphs 1 to 17, wherein the cathode layer comprises a material selected from: aluminium, stainless steel, copper, nickel, graphite-coated copper, graphite, or graphene film.

19. The device of any of paragraphs 1 to 18, wherein both the cathode layer and the lithium ion source are patterned to form pixels and wherein the pixels of the ion source correspond to the pixels of the cathode layer.

20. A method of varying the optical properties of the first surface of the active layer of the device of any of paragraphs 1 to 19, the method comprising varying the electric potential that is applied between the cathode layer and the active layer.

21. The method of paragraph 20, wherein the electric potential is varied between 0 and 5 V.

22. The method any of paragraphs 20 or 21, wherein the device is a device of paragraph 16 and wherein the step of varying the electric potential that is applied between the cathode layer and the active layer typically comprises independently varying the electric potential that is applied between each pixel of the cathode layer and the active layer.

23. The method of any of paragraphs 20 to 22, wherein an electric current is applied to the cathode layer.

24. The method of paragraph 23, wherein the electric current is varied between 0 and 1 A/cm$^2$.

25. A method of making a device of any of paragraphs 1 to 20, the method comprising the steps of: (i) contacting the second surface of the porous membrane with the lithium ion source (ii) diffusing liquid electrolyte comprising lithium ions into the porous membrane; and (iii) contacting the second surface of the active layer with the first surface of the porous membrane.

BRIEF DESCRIPTION OF THE DRAWINGS

Embodiments of the invention are further described hereinafter with reference to the accompanying drawings, in which.

DETAILED DESCRIPTION

Figure 1:
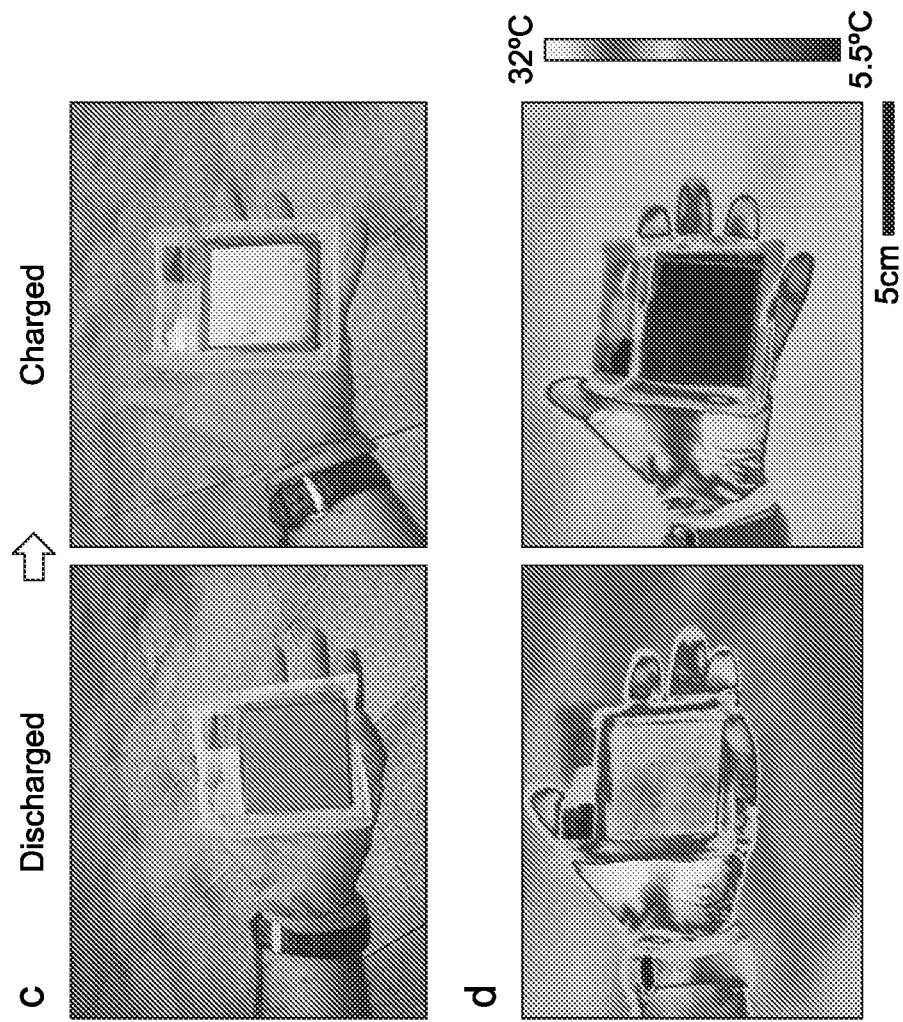
FIG. 1 shows examples of the device of the present invention. (a) Illustration of a device of the invention consisting of multilayer graphene (anode), electrolyte-containing membrane and aluminium foil coated with lithium-doped Ni—Mn—Co-oxide (cathode). (b) Illustration of Li$^+$ ion intercalation into the graphene layers. De-intercalation is achieved by reversing the current direction. (c) Visible and (d) infrared images of a device at fully discharged and charged states.
Figure 1:
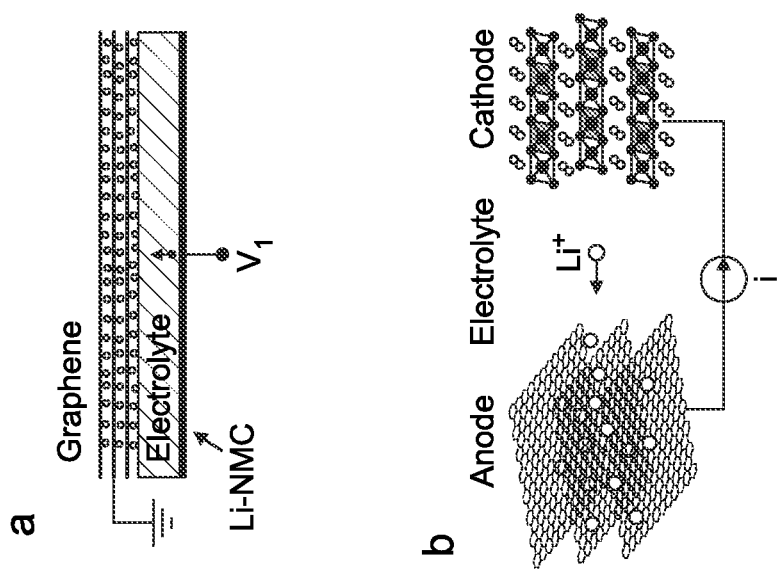

The term 'emissivity' refers to the ability of a surface of a material to emit energy as thermal radiation. Emissivity has a value between 0 and 1, and is quantitatively defined as the ratio of the thermal radiation from a material's surface to the radiation from an ideal black surface (i.e. a perfect emitter) at the same temperature and wavelength under the same conditions. The emissivity of a surface may be quantified by Fourier transform infrared spectroscopy (FTIR) measurements.

The term 'optical properties' refers to the emissivity of the active layer to radiation in the infrared, terahertz and/or ultraviolet range, or to the reflectivity of the active layer to radiation in the visible light range. The devices of the present invention modulate the absorption of visible light at the first surface of the active layer and modulate the emission of infra-red radiation from the first surface of the active layer by varying these optical properties. Typically, the devices of the invention comprise more than 50 layers of graphene. Graphene of this thickness does not allow the passage of visible light. The devices of the present invention accordingly do not transmit visible light.

The term 'visible light' typically refers to electromagnetic radiation having wavelengths in the range of 400 nm to 700 nm.

The term 'infra-red radiation' typically refers to electromagnetic radiation having wavelengths in the range of 0.7

μm to 50 μm. In certain embodiments of this invention, the term 'infra-red radiation' may refer to electromagnetic radiation having wavelengths in the range of 8 μm to 13 μm.

The term 'terahertz' typically refers to electromagnetic radiation having wavelengths in the range of 0.03 to 1 mm.

The term 'liquid electrolyte' refers to an electrically conducting solution comprising a substance dissolved in an organic or inorganic solvent, said solution being conductive under the conditions required to operate the devices of the invention. In certain embodiments of this invention, the solvent is a polar organic solvent. The substance may be a salt.

The term 'substantially opaque' typically refers to a material which prevents the transmission of at least 90% of visible light, e.g. at least 95%, or at least 99% of visible light.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

EXAMPLES

With this invention, the inventors demonstrate graphene-based electro-optical devices with optical tunability covering the entire electromagnetic spectrum from the visible to microwave. This non-volatile and reversible tunability is achieved by electro-intercalation of lithium into graphene layers, yielding a tuneable plasma frequency from 0.1 to 9 eV. This unique colour-changing capability, together with area-selective intercalation, lends itself to various applications of smart optical surfaces, including multispectral display devices and adaptive camouflage systems.

Example 1

Figure 2:
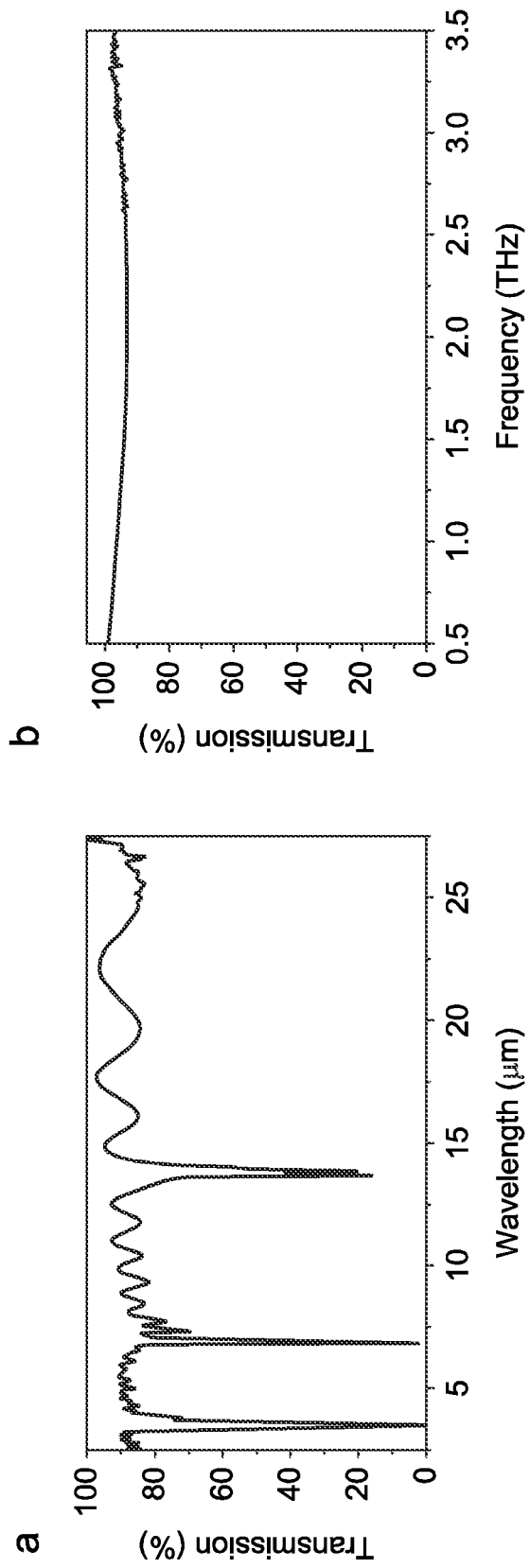
FIG. 2 shows transmission spectra of a 20-μm-thick polyethylene protective layer in the infrared and terahertz (THz). In the infrared range it has a few fingerprint absorptions. For the visible and THz regimes it shows uninterrupted high-level transparency

The device structure contains multilayer graphene as the anode electrode and Li:NMC (lithium nickel manganese cobalt oxide)-coated Al foil as the cathode (FIG. 1a). Unlike a lithium-ion battery, the graphene layer in the device is optically accessible. For a stable operation, the device is vacuum sealed in a polyethylene pouch that has very broad and high optical transparency from the visible to microwave wavelengths (FIG. 2). The MLG layer in an as-fabricated device is de-intercalated (discharged). Electro-intercalation of Li+ ions into the MLG, or charging, is achieved by applying a constant electric current (~1 mA/cm$^2$) towards the cathode (back electrode) (FIG. 1b). The device voltage was monitored to track the state of charge. Reversing the current direction de-intercalates the ions from the MLG, making the operation reversible and repeatable. During intercalation (or de-intercalation), the electrical and optical properties of the MLG change drastically. The discharged device (0 V) appears dark grey owing to the high absorptivity of the top de-intercalated MLG. When fully charged (at ~3.7 V), the MLG turns metallic and appears gold in colour (FIG. 1c). The infrared properties, following a similar trend, exhibit high absorptivity, hence emissivity, when discharged and high reflectivity when charged (FIG. 1d). Thermal imaging of the device is performed outdoors to minimize the background thermal emission reflected from the device. The intercalated MLG appears significantly colder to the thermal camera compared to its actual temperature (~30° C.) owing to its high infrared reflectivity and low background emission.

Figure 3:
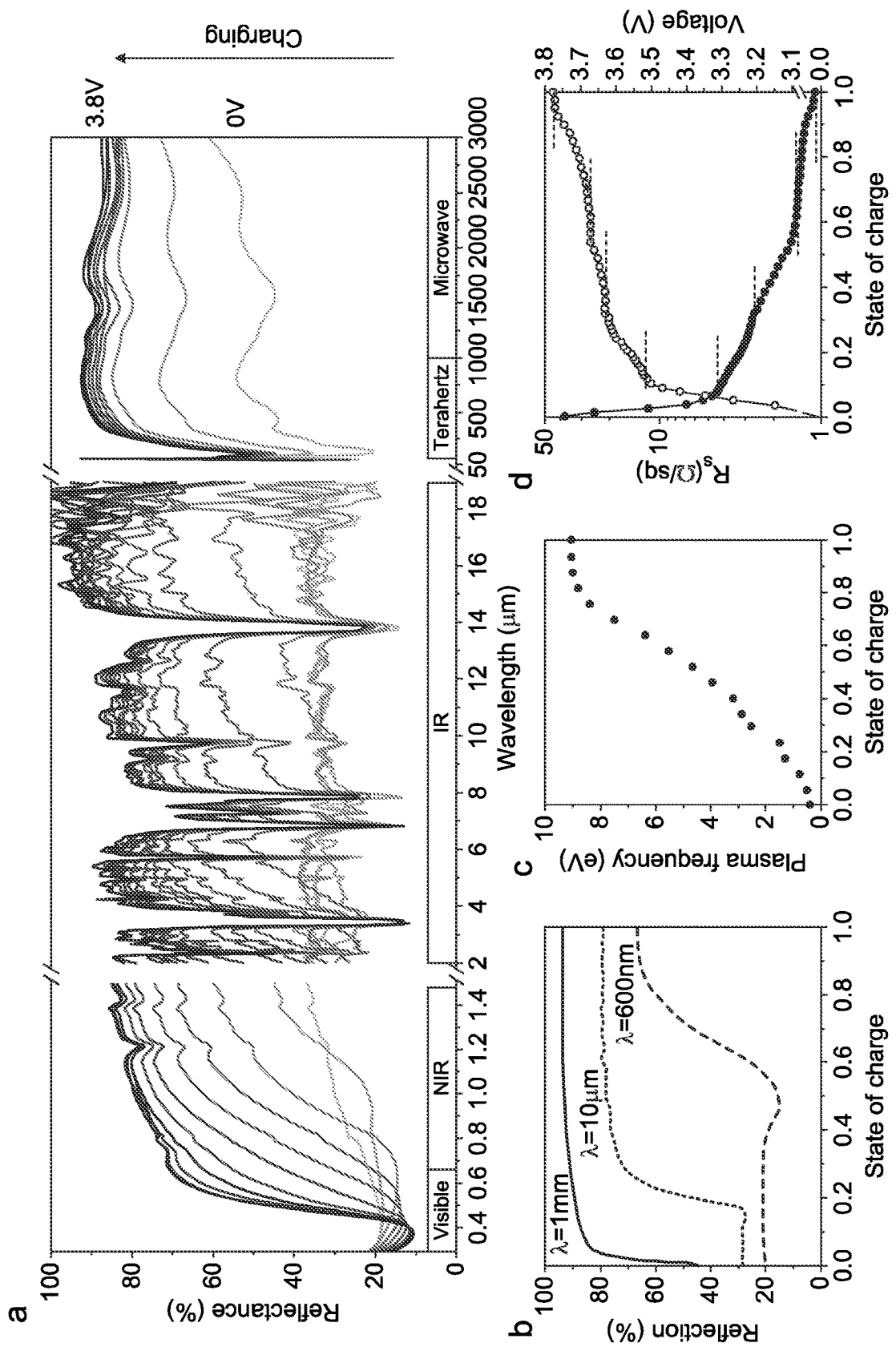
FIG. 3 shows the multispectral tunability of the devices of the present invention from visible to microwave wavelengths. (a) Reflection spectra of the device of the invention from the visible to microwave wavelengths for different doping conditions (state of charge). Reflection curves move up with increasing state of charge. (b) Variation in the reflectivity of the device at the selected wavelengths of 600 nm, 10 μm, and 1 mm. (c) Change in the plasma frequency as a function of the state of charge. (d) Evaluation of the device voltage and sheet resistance of MLG during charging. Dashed lines mark the different stages of lithiation of graphene (e.g., $LiC_6$, $LiC_{12}$, etc.).

The reflection spectrum of the device at different doping levels was measured to examine the multispectral response. By combining the reflection measurements from three different spectrometers (UV/VIS/NIR, FTIR, and time-domain terahertz spectrometer), the inventors obtained the reflectivity change from the ultraviolet (300 nm of wavelength) to microwave (3 mm of wavelength) as shown in FIG. 3a. A substantial reflectivity modulation covering the entire range of the non-ionising part of the electromagnetic spectrum was observed. FIG. 3b compares the reflectivity modulation for three different wavelengths that are orders of magnitude apart. The modulation onset varies with the wavelength of light. Terahertz (THz) reflectivity increases at the very early stage of doping.

On the other hand, modulation in the visible wavelength only appears at higher doping levels. The sharp drop in the reflectance with increasing photon energy is an indicator of a free-carrier plasma resonance, $\omega_p$. The reflection minimum shifts from the far-infrared to ultraviolet for increasing doping. The inventors obtained the plasma frequency, shown in FIG. 3c, by fitting the Drude model to the experimental reflection $$\varepsilon = \varepsilon_\infty + i\frac{\omega_p^2 \tau}{\omega(1 - i\omega\tau)},$$

where τ is the relaxation time of carriers and $\epsilon_\infty$ is the background dielectric constant. For the same device structure, FIG. 3d shows the variation of the sheet resistance of the MLG and the device voltage during the charging process. The inventors observed clear steps in these measurements indicating the distinct intercalation stages.

Figure 4:
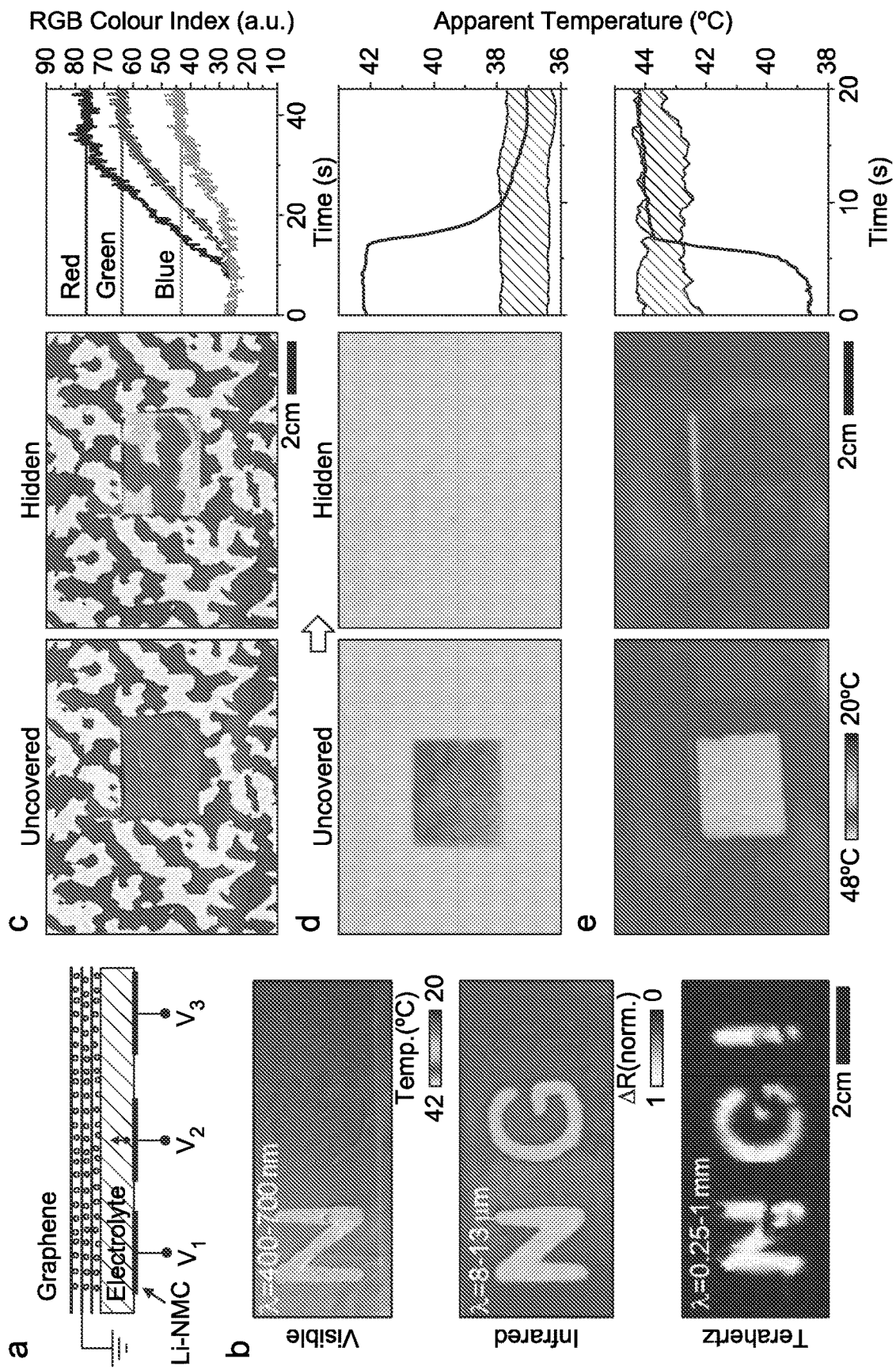
FIG. 4 shows the multispectral display and adaptive camouflage applications of the devices of the present invention. (a) Cross section illustration of a multispectral display based on area-selective lithiation. Patterned cathode electrodes define individually addressable pixels. (b) Images of a multispectral display device rendered in the visible, infrared, and terahertz (THz) regimes. The wavelength range of imaging is shown on each image. The display has 3 pixels patterned into letters "N", "G", and "I" kept at voltages of 3.8, 3.5, and 3.3 V, respectively, making "N" visible in visible, infrared, and THz, "G" in the infrared and THz, and "I" only in the THz. (c) Demonstration of adaptive visible camouflage. The device blends into a complex spatially varying background by matching its visible pattern. The graph shows the change in red, green and blue (RGB) colour indices from the active region of the device as it blends in. Vertical lines mark the background RGB indices. (d), (e) Demonstration of adaptive infrared camouflage. The device can adapt its infrared emission to blend in cold (d) and hot (e) backgrounds. The graph shows the time-trace of the apparent device temperature during the adaptation. The shaded areas show the range of the background temperature.

The inventors have produced a proof of concept device comprising a display capable of showing images in the visible, infrared and terahertz wavelengths simultaneously. FIG. 4a shows a cross-section illustration of the device consisting of patterned cathode electrodes and a continuous graphene layer. The underlying principle of the device is based on area-selective intercalation which can generate spatially and spectrally varying reflectivity. Controlling the voltage applied to an individual electrode enables variation of that pixel's reflectivity in different wavelength ranges. FIG. 4b showcases a sample display device with its back electrode patterned into letters "N", "G", and "I" (the initials of National Graphene Institute). Imaging of the device is performed by a CMOS camera operating in the visible (wavelength range of 400-700 nm), a thermal camera (wavelength range of 8-13 µm), and THz raster-scan imaging system (frequency range of 0.5-2 THz). The encoded patterns are concealed throughout the entire spectrum when the whole device is discharged. Applying 3.8, 3.5, and 3.3 V to "N", "G", and "I" pixels, respectively, reveals "N" in all images, "G" in the infrared and THz, and "I" only in the THz. Beyond the demonstrated function as multispectral display, this device has the potential to be used for optical security applications in which an encoded message can only be revealed with the correct key that corresponds to applying a specific voltage to the device and imaging in a specific range of wavelengths for this technology.

The inventors have also produced a multispectral adaptive camouflage system comprising a device of the invention which is able to modify its visible and infrared appearance dynamically. The visible dynamic camouflage is achieved by patterning the cathode electrode. Specific parts of the device are activated to match its appearance to that of a background with black and yellow patterns (FIG. 4c). The colour palette of the device can be enriched by colouring the top polyethylene layer. The graph in FIG. 4c quantifies the visible camouflage operation. It shows red, green, and blue (RGB) indices from the active region of the device matching the values of the background (vertical lines) as the device is activated. FIG. 4(d), (e) show thermal images of the device as it adapts its infrared emission to that of cold and hot backgrounds. Different background infrared emissions are achieved using static surfaces with contrasting infrared emissivity values on a hot plate fixed at 50° C.

These demonstrations highlight a comprehensive case of thermal camouflage where the background infrared emission dynamically changes as a result of the target moving into a different background or changing environmental factors, e.g., ambient temperature. While the backgrounds in these examples are kept relatively uniform, the inventors demonstrated that the approach used for the visible camouflage can be adapted for spatially varying thermal backgrounds. The time-trace of the infrared camouflage process reveals the high transition speed and quantifies how well the infrared emission from the device (rendered as the apparent temperature by the camera) adapts to the background (highlighted areas in FIG. 4(d), (e)).

Figure 5:
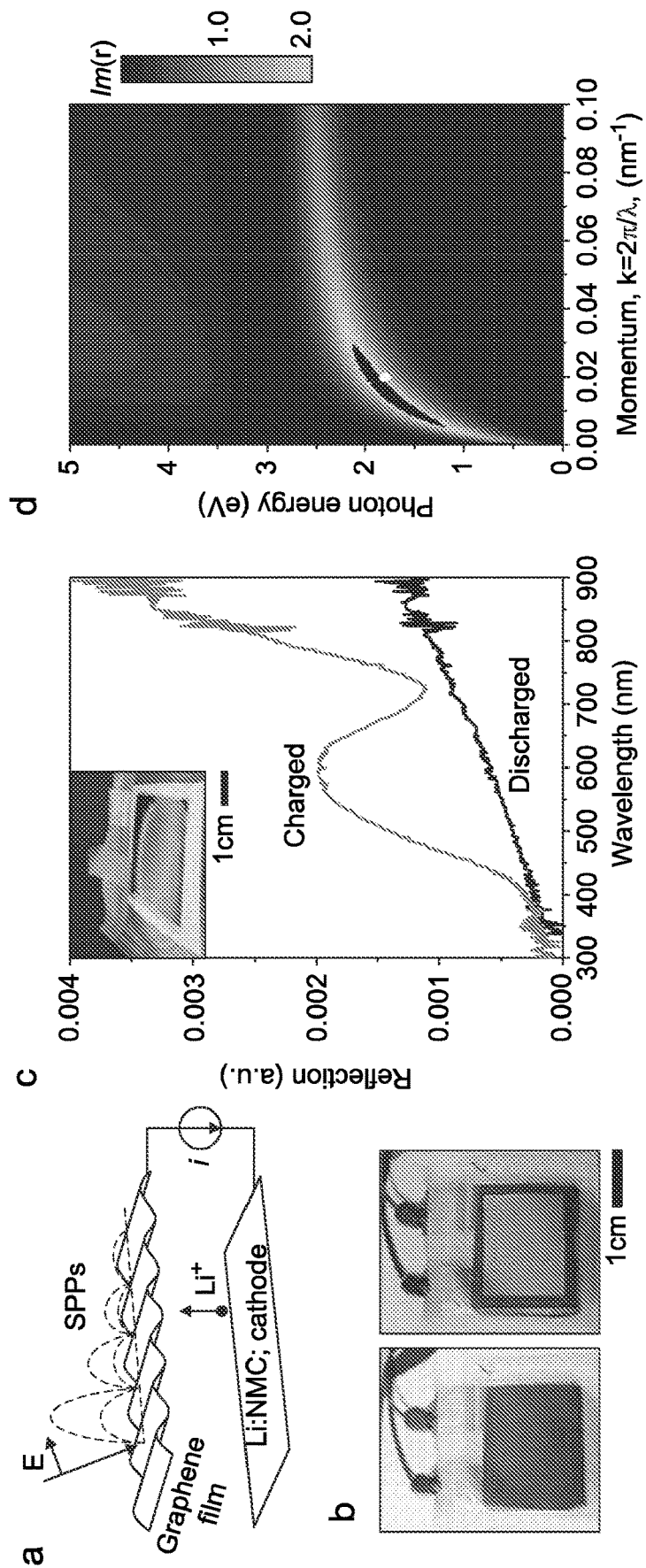
FIG. 5 shows an example of a programmable plasmonic surface in a device of the invention. (a) Illustration of the device used for observation of the electrically tuneable plasmons on corrugated graphene with 555 nm period. The grating is used to couple the plasmons on graphene surface. (b) Photographs of the device captured from the normal angle at the discharged and charged states. (c) Transverse Metallic (TM)-polarized reflection spectra of the discharged and charged states. (Inset) Photograph of the device recorded from an oblique angle revealing its diffracting nature. The reflection dip for the charged state reveals the grating's plasmon resonance. (d) Calculated dispersion relation for SPPs on graphene. A dot marks the location of the charged state on the map. Dashed line is the dispersion relation for light in free space.
Figure 6:
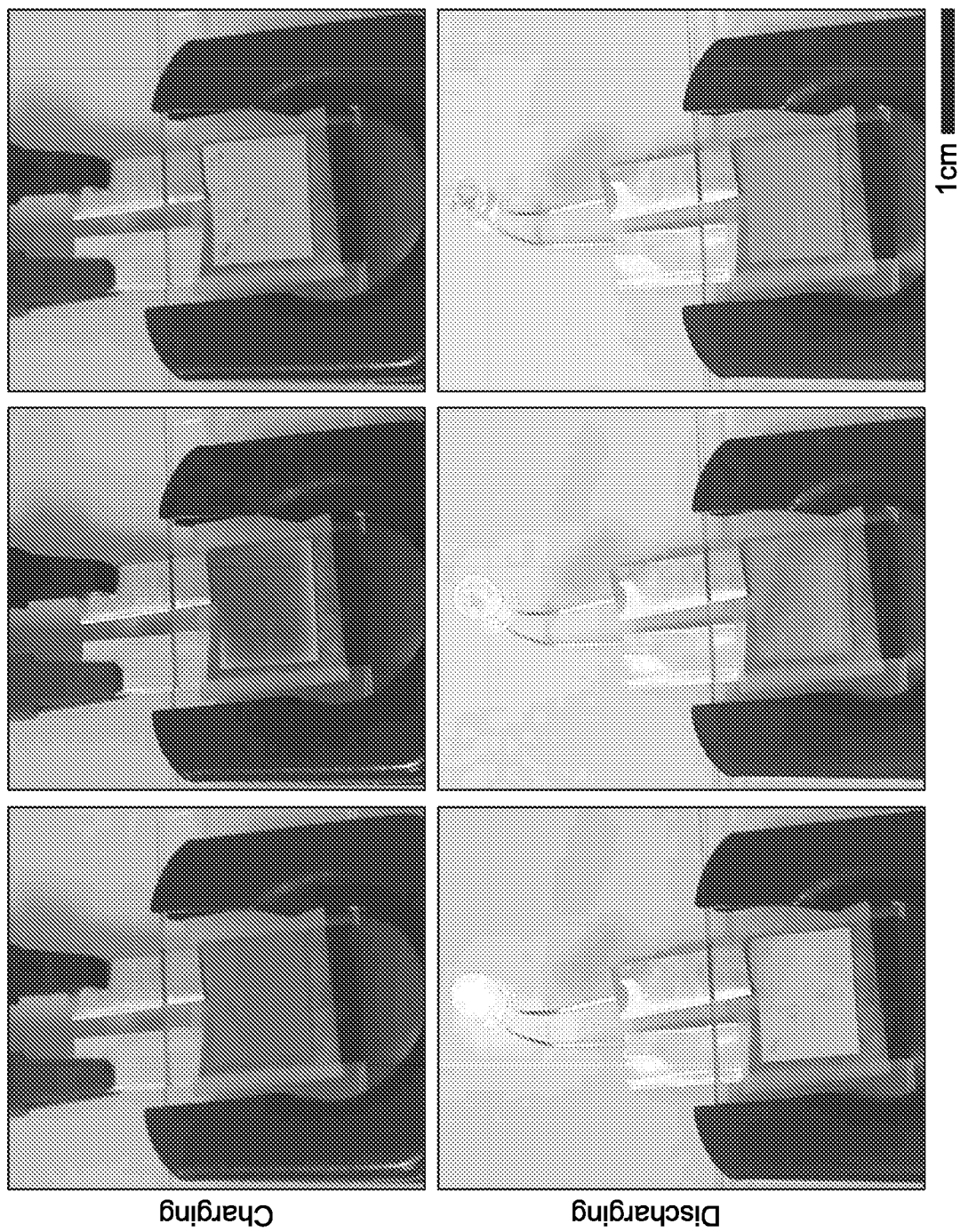
FIG. 6 shows photographs of a device during charging and discharging. Charging of the device was performed using an external constant current source. It was discharged through an LED.
Figure 7:
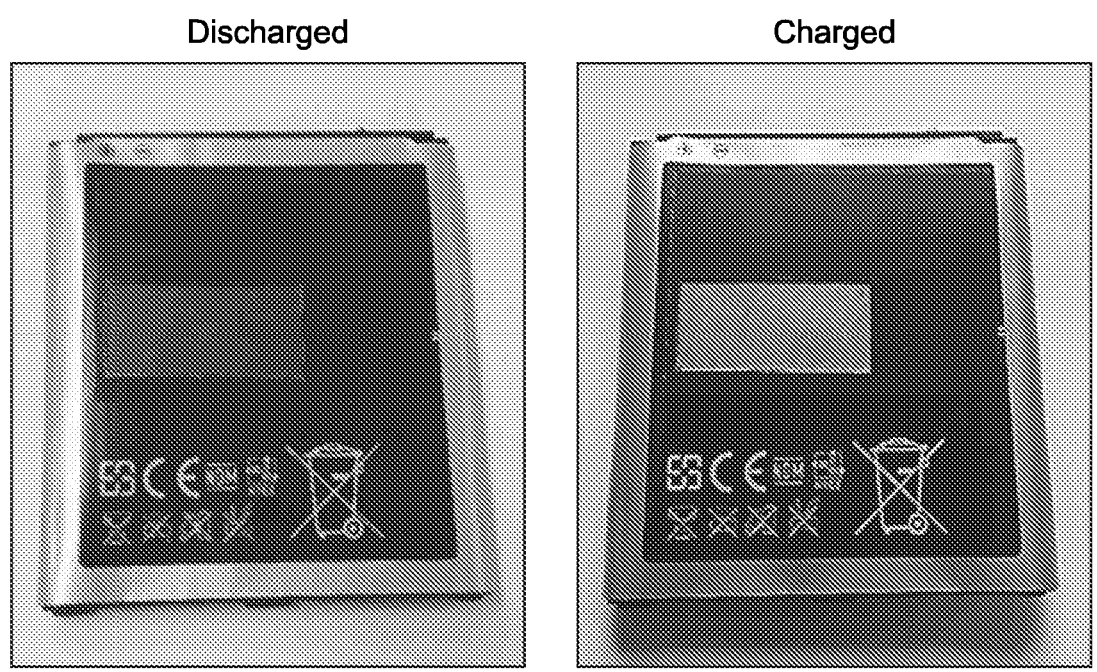
FIG. 7 shows graphene based electro-optical surfaces as an energy level indicator for commercially available Li-ion batteries at discharged and charged states.
Figure 8:
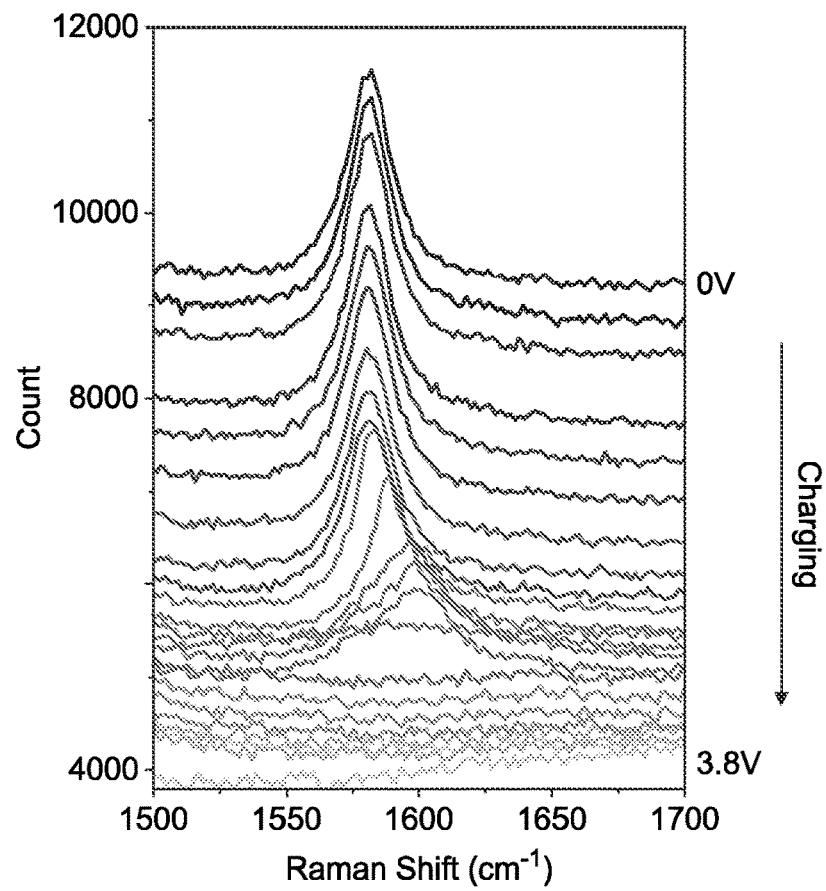
FIG. 8 shows a Raman spectrum of the multilayer graphene during the charging cycle using 457 nm excitation. The disappearance of the G band is due to the Pauli blocking.
Figure 9:
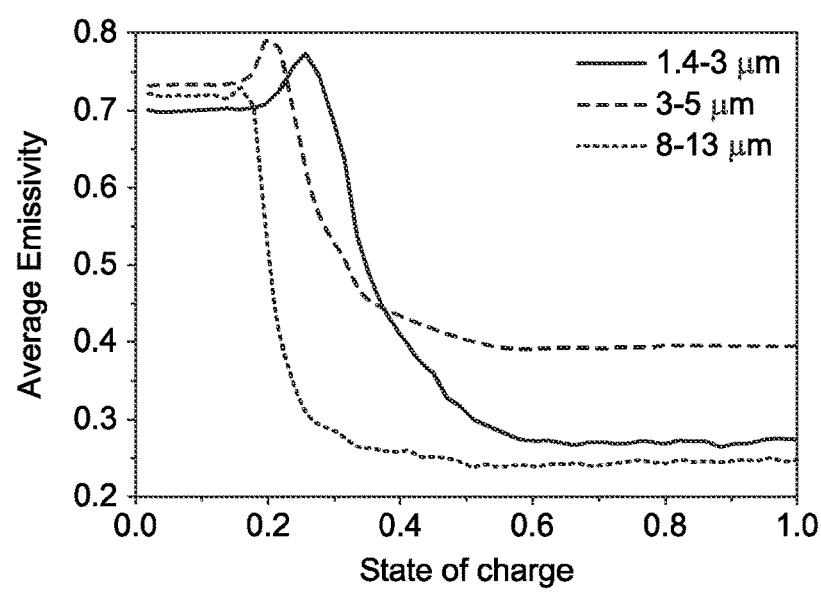
FIG. 9 shows the variation of the emissivity of the device for short-wave infrared (SWIR), mid-wave infrared (MWIR) and long-wave infrared (LWIR) wavelength ranges.
Figure 10:
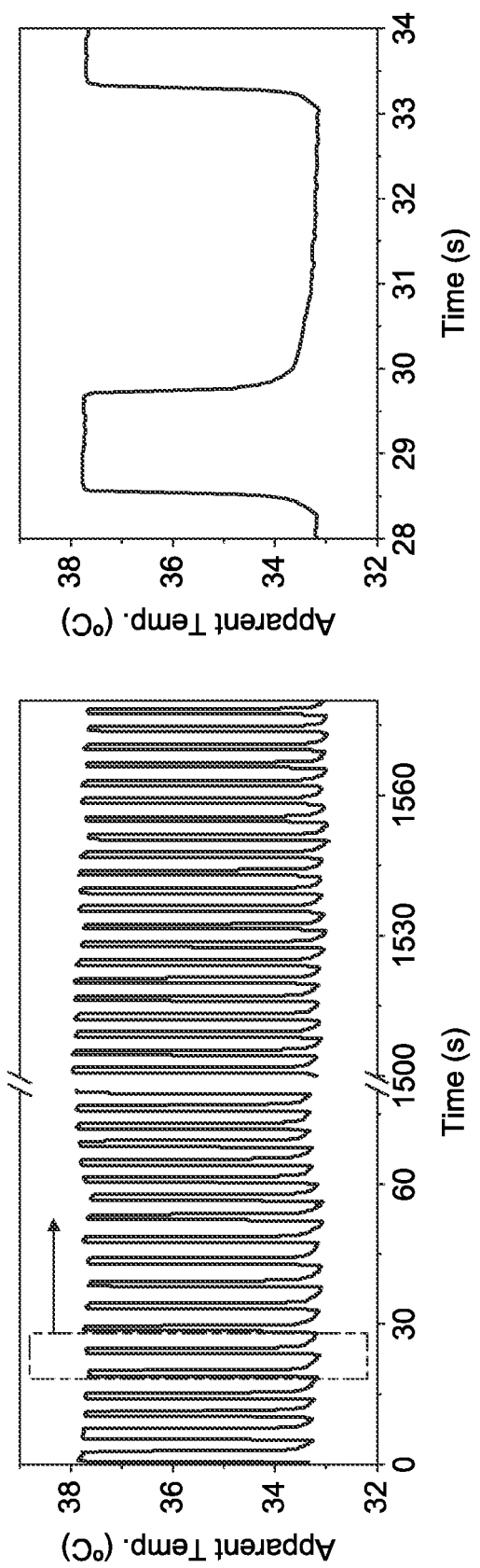
FIG. 10 shows a time trace of the apparent temperature of a device (captured by a thermal camera) during repeated charging and discharging cycles. The response time of the device is ~0.1 s.
Figure 11:
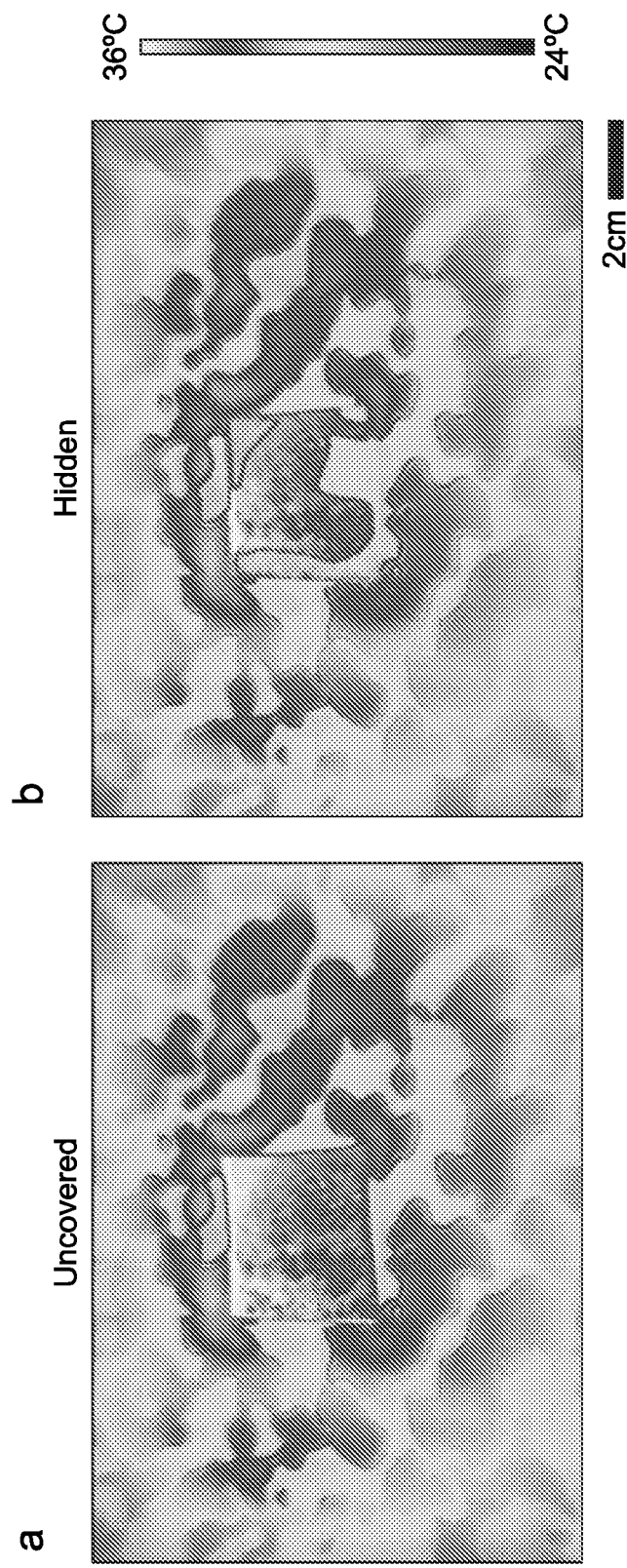
FIG. 11 shows thermal camouflage application for a background with spatially varying infrared emission.
Figure 12:
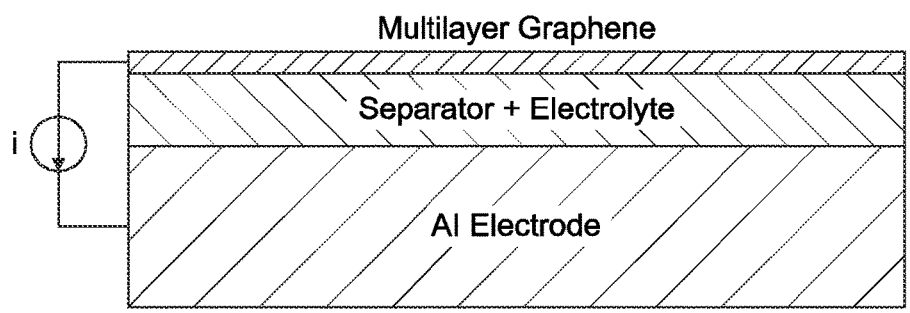
FIG. 12 shows an illustration of a device of the invention consisting of multilayer graphene (anode), a separator membrane including an aluminium-containing electrolyte, and aluminium foil (cathode).

Tuneable plasmonics is another exciting application of this technology. Metallic surfaces could support surface plasmon polaritons (SPP) when the dielectric constant is negative. For a Drude metal, this condition is satisfied for optical frequencies less than the plasma frequency, $\omega<\omega_p$. The large tunability of the plasma frequency of multilayer graphene enables a switchable multispectral platform for SPP. FIG. 5a shows the structure of the device to generate switchable plasmons on a corrugated graphene surface. The structure of the device includes a grating structure with 555 nm period to overcome the momentum mismatch between the confined SPPs and free-space light. FIG. 5c shows the measured reflection spectra and diffraction pattern for the charged state generated by the embossed grating structure. The inventors observed a distinct drop in the reflection spectrum at 720 nm that only appears for Transverse Magnetic (TM) polarized light and for charged state.

Example 2

Figure 13:
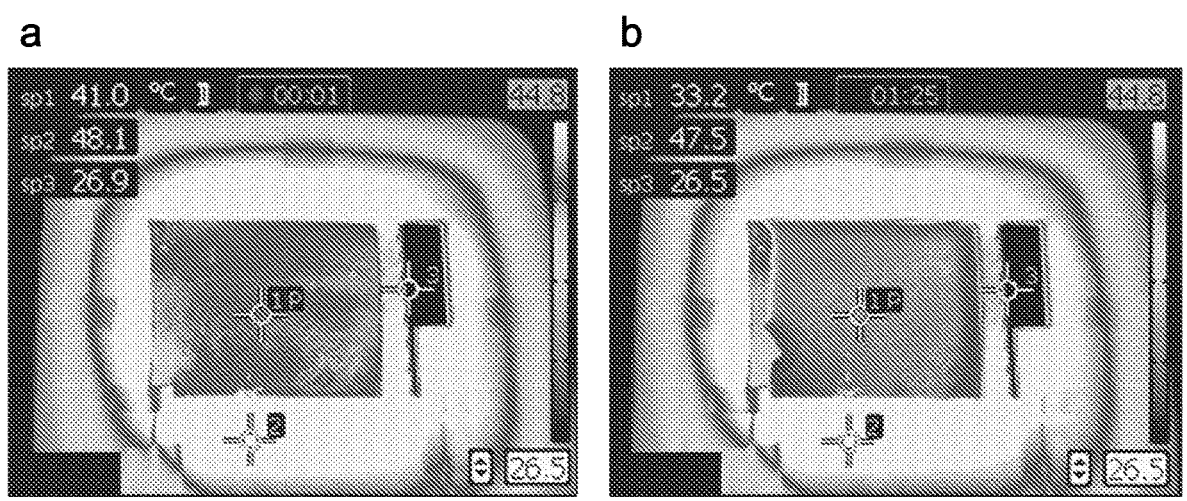
FIG. 13 shows infrared images of the Al devices at high (a) and low (b) emissivity states. The apparent temperature of the surface varies as intercalation of the device increases. SP1 shows the apparent temperature at the centre of the device.
Figure 14:
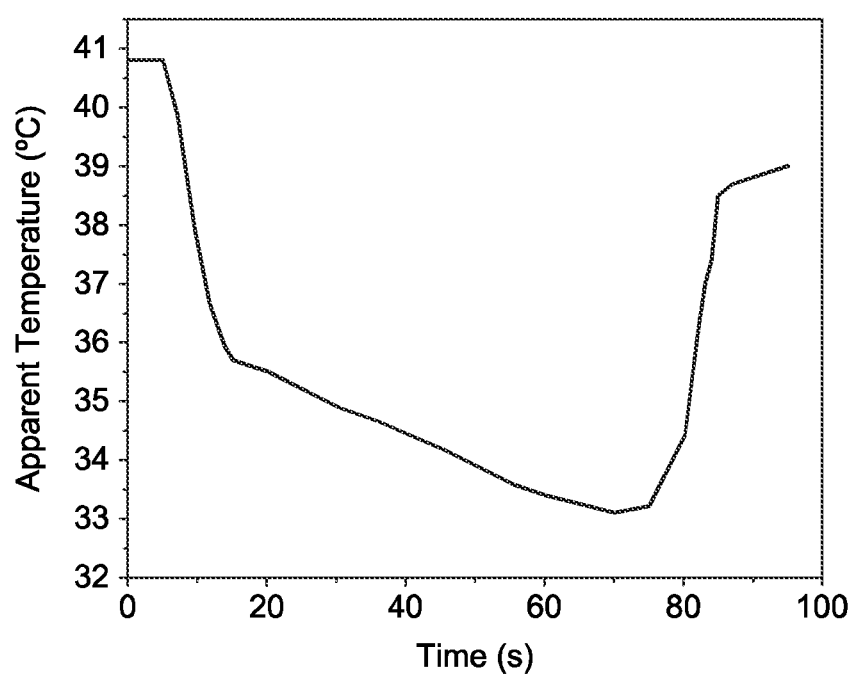
FIG. 14 shows the apparent temperature change of the surface against time as $AlCl_4^-$ ions are intercalated and deintercalated.

The inventors have also developed an alternative device containing multilayer graphene as the anode electrode, an Al foil cathode and a eutectic $AlCl_3$:EMIMCI (1-Ethyl-3-methylimidazolium chloride) liquid electrolyte in a ratio of 1.5:1 $AlCl_3$:EMIMCI by weight. The emissivity of the graphene surface is controlled in a similar way to the lithium-based devices in that electro-intercalation of $AlCl_4^-$ ions into the MLG, or charging, is achieved by applying a constant electric current towards the cathode (back electrode), thereby varying the electrical and optical properties of the MLG. FIG. 13 shows thermal images of these devices before and after intercalation of the MLG with $AlCl_4^-$ ions. Prior to intercalation, the thermal image of the MLG (FIG. 13a) appears substantially red in colour and indicates that the apparent temperature of the MLG (~41° C.) is close to the actual temperature of the MLG (~48° C.), suggesting high absorptivity and hence emissivity. However, following intercalation of the MLG with $AlCl_4^-$, the surface of the MLG appears substantially blue in colour under the thermal camera (FIG. 13b). The apparent temperature of the MLG is significantly colder (at ~33° C.) compared to its actual temperature (~48° C.), indicating high infrared reflectivity and low background emission following intercalation. After the device was discharged, the apparent temperature reading recovered to close to the initial temperature prior to intercalation (FIG. 14), indicating reversible intercalation of the $AlCl_4^-$ ions into the MLG.

Materials and Methods

Multi-layer graphene (MLG) was synthesized by a chemical vapour deposition system (planarTECH CVD) on 25-µm-thick nickel foils (Alfa Aesar, 12722). First, nickel foil substrate was heated to the growth temperature of 1050° C. under 100 sccm $H_2$, and 100 sccm Ar gases flow and annealed at 1050° C. for 20 minutes. Then, 35 sccm $CH_4$ flow was used as carbon precursor for 15 minutes at atmospheric pressure with addition to 100 sccm $H_2$, and 100 sccm Ar gases at 1050° C. After the growth, the sample was cooled down to the room temperature quickly under 100 sccm $H_2$ and 100 sccm Ar flow.

20-µm-thick polyethylene was laminated on MLG on Ni foil at 160° C. Ni was etched in 1M $FeCl_3$ solution in ~8 hours and rinsed with deionised water.

In example 1, Li:Nickel Manganese Cobalt Oxide (NMC) coated Al foil was used as cathode electrode. 25-µm-thick porous polyethylene membrane was placed on top of the NMC layer as a separator. A frame of Cu foil was placed on the porous polyethylene to function as an electrode for MLG. MLG transferred on polyethylene was placed on top of the separator as MLG facing down and in contact with the Cu frame. Battery grade $LiPF_6$ in EC/DEC 1:1 (Lithium hexafluorophosphate in ethylene carbonate and diethyl carbonate from Gelon Energy Co., Ltd.) applied to the separator (~250 µl for 3×3 $cm^2$ area). The device is placed in a polyethylene pouch and vacuum sealed. For the multispectral display device, NMC-coated Al foil was patterned with a plotter to electrically isolate them from each other. For the sheet resistance measurements, in addition to above procedure, 4 additional copper contacts were place on the corners of the MLG for the van der Pauw technique.

Characterisation

Visible and near-infrared (NIR) reflection measurements were performed with Cary 5000 UV-VIS-NIR spectrometer equipped with an integrating sphere. Infrared images and videos were recorded with a FLIR T660 thermal camera. Infrared reflection measurements were carried out using a Perkin Elmer Spectrum 100 FTIR spectrometer equipped with Mid-IR integrating sphere (PIKE Mid-IR IntegratIR) and a liquid nitrogen wide band cooled mercury-cadmium-telluride detector at a spectral resolution of 4 $cm^{-1}$.

Emissivity values were calculated from the measured reflection spectra ($\epsilon=1-R$). THz reflection measurements performed using time domain THz spectrometer (Toptica Teraflash) which uses two InGaAs photoconductive antennas as THz transmitter and receiver. THz pulse was guided using reflection head which contains 4 parabolic mirrors to focus the THz pulse onto a sample and focus the reflected THz pulse back to the receiver antenna. Raman measurements were taken via Renishaw Raman Spectrometer with 457 nm laser excitation, 2 accumulations with 5 s with 50× objective.

The invention claimed is:

1. A device for controlling the optical properties and/or emissivity of an active layer, the device comprising:
an active layer comprising from 15 to 500 atomic layers of graphene, the active layer having a first surface and a second surface, wherein the device is configured such that the first surface of the active layer is visible while the device is in use;
a porous membrane comprising a liquid electrolyte, said membrane having a first surface and a second surface; wherein the second surface of the active layer are in contact with the first surface of the porous membrane, and wherein the liquid electrolyte comprises metal ions;
a metal ion source in contact with the second surface of the porous membrane;
a cathode layer having a first surface and a second surface, wherein the first surface of the cathode layer is in contact with the metal ion source; and
a means for applying a controllably variable electric potential between the cathode layer and the active layer.

2. The device of claim 1, wherein the device further comprises a protective layer in contact with the first surface of the active layer.

3. The device of claim 2, wherein the protective layer may comprise one or more of: polyethylene, polypropylene, fluorinated ethylene propylene, diamond-like carbon, polytetrafluoroethylene, parylene, chlorinated parylene, fluorinated parylene, parylene derivatives, silicon and germanium thin films.

4. The device of claim 3, wherein the protective layer is polyethylene, optionally wherein the protective layer is low density polyethylene.

5. The device of claim 1, wherein the active layer comprises from 50 to 500 atomic layers of graphene.

6. The device of claim 1, wherein the active layer is flat.

7. The device of claim 1, wherein the device is a tunable plasmonic device.

8. The device of claim 7, wherein the active layer is corrugated.

9. The device of claim 1, wherein the porous membrane is a polymeric membrane.

10. The device of claim 9, wherein the porous membrane comprises one or more of: polyethylene, polypropylene, poly(tetrafluoroethylene), polyvinyl chloride, cotton, cellulose, cellulose paper, polyvinylidene fluoride (pvdf), polyolefins, polyester, nylon, nanofiber separators.

11. The device of claim 1, wherein the liquid electrolyte is absorbed into the porous membrane.

12. The device of claim 1, wherein the metal ion source is in contact with substantially all portions of the second surface of the porous membrane that correspond to the portions of the first surface of the porous membrane that are in contact with the active layer.

13. The device of claim 1, wherein the metal ions are lithium ions.

14. The device of claim 13, wherein the liquid electrolyte is selected from: lithium hexafluorophosphate, lithium hexafluoroarsenate monohydrate, lithium perchlorate, lithium tetrafluoro borate, lithium triflate, lithium bis(oxalato) borate, lithium hexafluoroarsenate, and lithium difluoro (oxalato) borate.

15. The device of claim 13, wherein the lithium ion source comprises a material selected from: lithium nickel manganese cobalt oxide (NMC), lithium cobalt oxide (LCO), lithium manganese oxide (LMO), lithium iron phosphate (LPF), lithium nickel manganese spinel (LNMO), lithium nickel cobalt aluminium oxide (NCA), lithium foil, lithium chips, lithium-coated foils, and lithium metal coating.

16. The device of claim 15, wherein the lithium ion source is lithium nickel manganese cobalt oxide (NMC).

17. The device of claim 1, wherein the cathode layer comprises a material selected from: aluminium, stainless steel, copper, nickel, graphite-coated copper, graphite, or graphene film.

18. The device of claim 1, wherein the cathode layer and/or the metal ion source are patterned to form pixels and wherein the pixels of the ion source correspond to the pixels of the cathode layer.

19. A method of varying the optical properties of the first surface of the active layer of the device for controlling the optical properties and/or emissivity of an active layer, the device comprising: an active layer comprising from 15 to 500 atomic layers of graphene, the active layer having a first surface and a second surface, wherein the device is configured such that the first surface of the active layer is visible while the device is in use; a porous membrane comprising a liquid electrolyte, said membrane having a first surface and a second surface; wherein the second surface of the active layer are in contact with the first surface of the porous membrane, and wherein the liquid electrolyte comprises metal ions; a metal ion source in contact with the second surface of the porous membrane; a cathode layer having a first surface and a second surface, wherein the first surface of the cathode layer is in contact with the metal ion source; and a means for applying a controllably variable electric potential between the cathode layer and the active layer, the method comprising varying the electric potential that is applied between the cathode layer and the active layer.

20. The method of claim 19, wherein the electric potential is varied between 0 and 5 V.

21. The method of claim 19, wherein the metal ions in the device are lithium ions and wherein the liquid electrolyte in the device is selected from lithium hexafluorophosphate, lithium hexafluoroarsenate monohydrate, lithium perchlorate, lithium tetrafluoro borate, lithium triflate, lithium bis(oxalato)borate, lithium hexafluoroarsenate, and lithium difluoro (oxalato) borate, and wherein varying the electric potential that is applied between the cathode layer and the active layer typically comprises independently varying the electric potential that is applied between each pixel of the cathode layer and the active layer.

22. The method of claim 19, wherein an electric current is applied to the cathode layer.

23. The method of claim 22, wherein the electric current is varied between 0 and 1 A/cm2.

24. A method of making a device for controlling the optical properties and/or emissivity of an active layer, the device comprising: an active layer comprising from 15 to 500 atomic layers of graphene, the active layer having a first surface and a second surface, wherein the device is configured such that the first surface of the active layer is visible while the device is in use; a porous membrane comprising a liquid electrolyte, said membrane having a first surface and a second surface; wherein the second surface of the active layer are in contact with the first surface of the porous membrane, and wherein the liquid electrolyte comprises metal ions; a metal ion source in contact with the second surface of the porous membrane; a cathode layer having a first surface and a second surface, wherein the first surface of the cathode layer is in contact with the metal ion source; and a means for applying a controllably variable electric potential between the cathode layer and the active layer, the method comprising: (i) contacting the second surface of the porous membrane with the metal ion source (ii) diffusing liquid electrolyte comprising metal ions into the porous membrane; and (iii) contacting the second surface of the active layer with the first surface of the porous membrane.

* * * * *